United States Patent
Qian et al.

(10) Patent No.: US 11,740,619 B2
(45) Date of Patent: Aug. 29, 2023

(54) MALFUNCTION EARLY-WARNING METHOD FOR PRODUCTION LOGISTICS DELIVERY EQUIPMENT

(71) Applicant: NANJING UNIVERSITY OF AERONAUTICS AND ASTRONAUTICS, Nanjing (CN)

(72) Inventors: Xiaoming Qian, Nanjing (CN); Peihuang Lou, Nanjing (CN); Xinhao Wang, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 482 days.

(21) Appl. No.: 16/968,145

(22) PCT Filed: Oct. 21, 2019

(86) PCT No.: PCT/CN2019/112249
§ 371 (c)(1),
(2) Date: Aug. 6, 2020

(87) PCT Pub. No.: WO2020/140560
PCT Pub. Date: Jul. 9, 2020

(65) Prior Publication Data
US 2021/0041862 A1    Feb. 11, 2021

(30) Foreign Application Priority Data
May 31, 2019    (CN) .......................... 201910472866.5

(51) Int. Cl.
G05B 23/02    (2006.01)
G06N 3/08    (2023.01)
G06Q 10/08    (2023.01)

(52) U.S. Cl.
CPC .......... *G05B 23/0245* (2013.01); *G06N 3/08* (2013.01); *G06Q 10/08* (2013.01); *G05B 2223/02* (2018.08)

(58) Field of Classification Search
CPC .................................................. G05B 23/0245
See application file for complete search history.

(56) References Cited

U.S. PATENT DOCUMENTS

| | | | |
|---|---|---|---|
| 6,618,632 B1 * | 9/2003 | Federl | G05B 23/0221 700/121 |
| 2010/0023307 A1 * | 1/2010 | Lee | G06F 18/2137 703/7 |

FOREIGN PATENT DOCUMENTS

| | | |
|---|---|---|
| CN | 107506865 A | 12/2017 |
| CN | 109002031 A | 12/2018 |

(Continued)

*Primary Examiner* — Hyun D Park
(74) *Attorney, Agent, or Firm* — Treasure IP Group, LLC

(57) ABSTRACT

Disclosed is a malfunction early-warning method for production logistics delivery equipment. After a sensor obtains past signal data, performing feature extraction and dimensionality reduction so as to obtain a feature vector; using a growing neural gas (GNG) algorithm to divide normal state data into different operation situations so as to obtain several cluster centers, and calculating the Euclidean distance between the feature vector and the cluster centers obtained from current operation data, so as to obtain a similarity trend; constructing a past memory matrix, using an improved particle swarm algorithm to optimize an LS-SVM regression model parameter, and calculating the residual value of the current state. Finally, combining the residual value and the similarity trend to obtain a risk coefficient, assessing the equipment state, and issuing an early warning for an equipment malfunction.

12 Claims, 1 Drawing Sheet

(56) References Cited

FOREIGN PATENT DOCUMENTS

| | | | |
|---|---|---|---|
| CN | 109087008 | A | 12/2018 |
| CN | 109657847 | A | 12/2018 |
| CN | 110322048 | A | 10/2019 |

\* cited by examiner

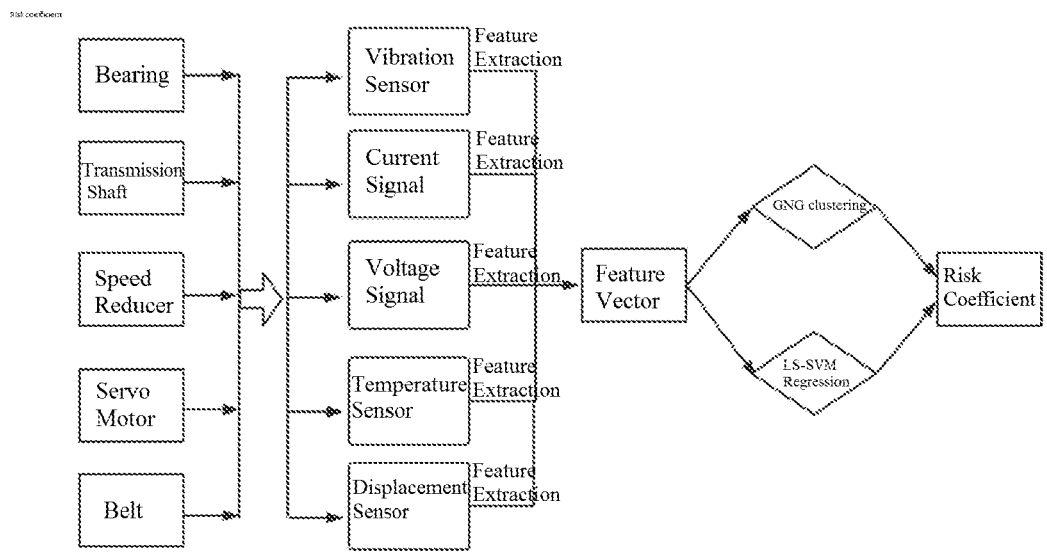

MALFUNCTION EARLY-WARNING METHOD FOR PRODUCTION LOGISTICS DELIVERY EQUIPMENT

CROSS REFERENCE TO RELATED APPLICATION

This application claims priority to a PCT application PCT/CN2019/112249, filed on Oct. 21, 2019, which in turn takes priority of Chinese Application No. 201910472866.5, filed on May 31, 2019. Both the PCT application and Chinese Application are incorporated herein by reference in their entireties.

TECHNICAL FIELD

The present invention belongs to the field of intelligent system technology application, and particularly relates to a malfunction early warning method of production logistics delivery equipment.

BACKGROUND ART

Currently, with widespread application of intelligent equipment in production workshops, since the intelligent equipment has many parts and a complicated internal structure, judging an equipment operation state and making a malfunction early warning according to conventional artificial experience are not feasible. Meanwhile, production data collected by an intelligent sensor and equipment operation data become more and more precise, but most data is only stored into a database at present, and is not utilized. In an automobile assembly workshop, production cycles are fast, and the production volume is great, so that huge economic loss may be caused by shutdown due to faults of automobile assembly delivery equipment.

Therefore, it is critical to realize a set of automatic equipment fault real-time early warning system. The system can perform early warning on faults possibly generated by the equipment in real time, so that production loss caused by the equipment shutdown is reduced, and the production efficiency is improved. The existing intelligent equipment has more and more complicated structure and more and more parts, and additionally, a series of faults may be caused if a single part goes wrong, so that a malfunction early warning method of production logistics delivery equipment has great practical significance. In literature "Initial Fault Detection and Condition Monitoring of Rolling Bearings Based on Mahalanobis-Taguchi System [master's thesis], Lanzhou, Lanzhou University of Technology, 2016", a fault diagnosis technology of bearings is analyzed. For mechanical production equipment, the fault diagnosis technology can detect a fault type and a fault source. In a patent "Equipment Early Fault Warning Method and Device, Chinese patent: CN109087008A, 2018 Dec. 25", at least two long-time change trend values are decomposed from a time sequence, the decomposed long-time change trend values are subjected to linear regression fitting to obtain a fitting curve, and a malfunction early warning time point corresponding to an index to be detected is determined according to the fitting curve and a preset early warning value. In a patent "Method Applied to Monitoring System Equipment Fault Diagnosis and Intelligent Early Warning, Chinese patent: CN109002031A, 2018 Dec. 14", according to a relationship between different warning events, warning cascade connection groups are built, warning event generation is used as a triggering condition, whether the warning of the same cascade connection group simultaneously exists in a certain time is automatically judged, and association information between the warning events is generated, but global state or performance of the equipment cannot be evaluated. In order to improve safety and reliability, state evaluation is critical. It not only reflects a global degradation degree of the equipment so as to provide reference for enterprises, but also provides a necessary basis for next step prediction and health management at the same time.

However, an existing state evaluation study is mainly concentrated on parts or component units, such as bearings and some electronic systems. There is no enough study on the global evaluation of the health state of mechanical equipment. Considering the complexity of the mechanical equipment, the health state reflection of the equipment needs to be performed on the basis of the parts and components. Each part has different importance in one piece of equipment, so that different weights should be given to state features collected by the sensor. However, there is a lack of weight decision method for studying the state evaluation at present. A common method is to give weights according to experience, but those weights cannot reflect a change rate of attribute data.

SUMMARY OF THE INVENTION

In order to solve the technical problems in the prior art, the present invention aims at providing a malfunction early warning method of production logistics delivery equipment, so as to overcome defects in an existing state diagnosis technology, and realize early fault warning of the production logistics delivery equipment.

In order to achieve the technical purposes, the invention uses the following technical scheme:

a malfunction early warning method of production logistics delivery equipment includes the following steps:

step 1, calculating a feature vector of a historical normal operation state, dividing normal state data into a plurality of work conditions to obtain a plurality of clustering centers, and calculating a Euclidean distance from a current state to the clustering centers so as to obtain a similarity trend;

step 2, building a historical memory matrix, optimizing parameters of an LS-SVM regression model by an improved particle swarm algorithm, and calculating a residual of the current state and the regression model; and step 3, obtaining a risk coefficient by combining the similarity trend and the residual, evaluating an equipment operation state, and making timely early warning on faults.

Further, the step 1 includes the following specific processes:

step 1.1, performing initialization: creating two nodes with weight vectors, and a zero value of a local error;

step 1.2, inputting a vector into a neural network x, and finding two nerve cells s and t in positions closest to the x, i.e., the nodes with weight vectors $w_s$ and $w_t$, wherein $\|w_s-x\|^2$ is a node with a smallest distance value in all nodes, and $\~w_t-x\|^2$ is a node with a second-smallest distance value in all nodes;

step 1.3, updating a local error of the winner nerve cell s, and adding the local error of the winner nerve cell s into a squared distance of the vector $w_s$ and the x:

$$E_s \leftarrow E_s + \|w_s-x\|^2 \qquad (1);$$

step 1.4, translating the winner nerve cell s and all topological neighbors thereof, wherein a direction is an input vector x, and distances equal to partial $\in_w$ and whole $\in_n$:

$$w_s \leftarrow w_s + \in_w \cdot (w_s - x) \quad (2), \text{ and}$$

$$w_n \leftarrow w_n + \in_n \cdot (w_n - x) \quad (3);$$

step 1.5, by using 1 as a step amplitude, increasing ages of all connections from the winner nerve cell s, and removing the connections with the ages being elder than $age_{max}$; and if a result in the nerves cells does not have more divergence margins, also removing the nerve cells;

step 1.6, if the number of current iterations is a multiple of $\lambda$, and does not reach a limit dimension of a network, inserting a new nerve cell r as follows;

step 1.7, reducing all errors of a nerve cell j by using a fraction $\beta$:

$$E_j \leftarrow E_j - E_j \cdot \beta \quad (4); \text{ and}$$

step 1.8, if a stop condition is not met, continuing the step 2.

Further, in the step 2, the improved particle swarm algorithm is used to optimize a kernel function $\sigma$ and a penalty coefficient c in the LS-SVM regression model.

Further, the step 3 includes the following specific processes:

step 3.1, calculating a residual $r_i$ of the current state;

step 3.2, calculating a similarity trend $t_i$ of the current state; and step 3.3, calculating a risk coefficient $d_i$.

Further, the step 1.6 includes the following specific processes:

step 1.6.1, determining a nerve cell u with a greatest local error;

step 1.6.2, determining a nerve cell v, with a greatest error, of the u in neighbors;

step 1.6.3, creating a "middle" node r in the middle between the u and the v:

$$w_r = \frac{w_u + w_v}{2}; \quad (6)$$

step 1.6.4, replacing an edge between the u and the v with an edge between the u and the r and an edge between the v and the r; and step 1.6.5, reducing the errors of the nerve cells u and v, and setting an error value of the nerve cell r:

$$E_u \leftarrow E_u \cdot a \quad (7),$$

$$E_v \leftarrow E_v \cdot a \quad (8), \text{ and}$$

$$E_r < E_u \quad (9).$$

Further, the step 2 includes the following specific processes:

step 2.1.1, building the LS-SVM regression model: introducing a Lagrangian function for solving it, and selecting a radial basis function $K(x, x_i) = \exp(-\|x - x_i\|_2 / 2\sigma^2)$, wherein $\sigma$ is a kernel width; and obtaining the LS-SVM regression model:

$$f(x) = \sum_{i=1}^{l} \alpha_i K(x, x_i) + b; \quad (5)$$

step 2.1.2, checking whether a historical optimum adaptive degree $P_b$ meets a constraint condition or whether the number of iterations reaches the maximum, if the constraint condition is still not met, and the number of iterations is not the maximum, performing a step 2.1.3, and otherwise, mapping a result into the kernel function $\sigma$ and the penalty coefficient c of the LS-SVM model; and step 2.1.3, regulating speed and positions of particles, and regulating an inertia weight.

Further, in the step 2.1.3, a self-adaptative regulation inertia weight method is used to regulate the inertia weight:

$$w = \begin{cases} w_{min} - \dfrac{(w_{max} - w_{min})(f - f_{min})}{f_{avg} - f_{min}}, & f < f_{avg} \\ w_{max}, & f \geq f_{avg} \end{cases} \quad (10)$$

wherein in the formula, $w_{min}$ is a minimum value of w, $w_{max}$ is a maximum value of w, f is an adaptive degree of a current particle, $f_{avg}$ is an average adaptive value of all particles, and $f_{min}$ is a minimum adaptive value of all particles.

Further, a specific process for calculating the residual $r_i$ of the current state in the step 3.1 is as follows:

$$r_i = y_i - f(x_i) \quad (11)$$

wherein in the formula, $y_i$ is a true value in a sample set, and $f(x_i)$ is a predicated value of the LS-SVM regression model after optimization by the improved particle swarm algorithm.

Further, a specific process for calculating the similarity trend of the current state in the step 3.2 is as follows:

$$t_i = \frac{1}{n} \sqrt{\sum_{j=1}^{n} (x_i - X_j)^2} \quad (12)$$

wherein in the formula, $x_i$ is a coordinate of the current state, and $X_j$ is a coordinate of the j-th clustering center.

Further, a specific process for calculating the risk coefficient $d_i$ in the step 3.3 is as follows:

$$d_i = ar_i + bt_i \quad (13)$$

wherein in the formula, a and b are weight factors, and are initialized to 0.5 and 0.5 according to historical data.

Further, the step of translating the winner nerve cell s and all topological neighbors thereof refers to all nerve cells having connections with the winner nerve cell s.

As a preference, in the step 1.5, if the two optimum nerve cells s and t are connected, the age of the connection is set to be zero, and otherwise, a connection is created between the two optimum nerve cells.

As a preference, in the step 1, a growing neural gas (GNG) algorithm is used to calculate the feature vector of the historical normal operation state.

By using the technical scheme, the following beneficial effects are realized: historical signal data obtained by the sensor is firstly subjected to feature extraction and dimension reduction processing to obtain the feature vector. For the feature vector, on one hand, the GNG algorithm is used to divide the normal state data into the plurality of work conditions to obtain the plurality of clustering centers, and the Euclidean distance from the feature vector obtained from current operation data to the clustering centers is calculated so as to obtain the similarity trend; on the other hand, the historical memory matrix is built, the parameters of the LS-SVM regression model are optimized by the improved particle swarm algorithm, and the residual of the current state is calculated. Finally, by combining the residual and the similarity trend, the risk coefficient is obtained, the equipment state is evaluated, and early warning is made on equipment faults.

BRIEF DESCRIPTION OF THE DRAWINGS

FIG. 1 is a flow diagram of an embodiment of the present invention.

DETAILED DESCRIPTION OF THE INVENTION

The technical scheme of the present invention is illustrated in detail in conjunction with the drawings.

Referring to FIG. 1, in order to realize the uninterrupted collection and processing of signal data, a large number of smart sensors are arranged in the production line. All sensors need to adopt active power supply and be installed inside the metal box to enhance the electromagnetic shielding ability. After the data is collected, it is continuously transmitted to the designated port of the data center server through the optical fiber ring network of the automobile assembly workshop for 24 hours.

The present embodiment illustrates a malfunction early warning method of delivery equipment for automobile assembly of the present invention by taking the equipment used in automobile assembly line production as an example. As shown in FIG. 1, the method includes the following steps:

Step 1, data collection: state data, including vibration acceleration signals of two bearings and a speed reducer, belt displacement and the like, of main parts of the equipment used in production are collected by a sensor.

Step 2, feature parameter extraction: feature extraction is performed on different data by using different feature extraction technologies.

Step 3, data dimension reduction: an effective value and a peak value of vibration removal are averaged. Then, a feature vector with a dimension being 7 is synthesized. The steps are repeated to obtain a plurality of feature vectors with the dimension being 7;

Step 4, building of a growing neural gas (GNG) neural network model: for data with a historical normal operation state, a GNG algorithm is used to divide normal state data into a plurality of work conditions to obtain a plurality of clustering centers, and a Euclidean distance from a current state to the clustering centers is calculated so as to obtain a similarity trend.

Step 5, building of an LS-SVM regression model: a historical memory matrix is built. Parameters of the LS-SVM regression model are optimized by an improved particle swarm algorithm. A residual of the current state and the regression model is calculated.

Step 6, risk coefficient calculation: a risk coefficient is obtained by combining the similarity trend and the residual. An equipment operation state is evaluated. Timely early warning is made on faults.

A malfunction early warning method of production logistics delivery equipment includes the following steps:

Step 1, a feature vector of a historical normal operation state is calculated. Normal state data is divided into a plurality of work conditions to obtain a plurality of clustering centers. A Euclidean distance from a current state to the clustering centers is calculated so as to obtain a similarity trend.

Step 2, a historical memory matrix is built. Parameters of an LS-SVM regression model are optimized by an improved particle swarm algorithm. A residual of the current state and the regression model is calculated.

Step 3, a risk coefficient is obtained by combining with the similarity trend and the residual. An equipment operation state is evaluated. Timely early warning is made on faults.

Further, the step 1 includes the following specific processes:

Step 1.1, initialization is performed. Specifically, two nodes with weight vectors, and a zero value of a local error are created.

Step 1.2, a vector is input into a neural network x. Two nerve cells s and t in positions closest to the x, i.e., the nodes with weight vectors $w_s$ and $w_t$, are found. $\|w_s-x\|^2$ is a node with a smallest distance value in all nodes, and $\|w_t-x\|^2$ is a node with a second-smallest distance value in all nodes.

Step 1.3, a local error of the winner nerve cell s is updated, and the local error of the winner nerve cell s is added into a squared distance of the vector $w_s$ and the x:

$$E_s \leftarrow E_s + \|w_s-x\|^2 \qquad (1).$$

Step 1.4, the winner nerve cell s and all topological neighbors thereof are translated. An direction is an input vector x, and distances equal to partial $\in_w$ and whole $\in_n$:

$$w_s \leftarrow w_s + \in_s \cdot (w_s-x) \qquad (2), \text{ and}$$

$$w_n \leftarrow w_n + \in_n \cdot (w_n-x) \qquad (3);$$

Step 1.5, by using 1 as a step amplitude, ages of all connections from the winner nerve cell s are increased, and the connections with the ages being elder than $age_{max}$ are removed. If a result in the nerves cells does not have more divergence margins, the nerve cells are also removed.

Step 1.6, if the number of current iterations is a multiple of λ, and does not reach a limit dimension of a network, a new nerve cell r is inserted as follows.

Step 1.7, all errors of a nerve cell j are reduced by using a fraction β:

$$E_j \leftarrow E_j - E_j \cdot \beta \qquad (4).$$

Step 1.8, if a stop condition is not met, the step 2 is continued.

Further, in the step 2, the improved particle swarm algorithm is used to optimize a kernel function σ and a penalty coefficient c in the LS-SVM regression model.

Further, the step 3 includes the following specific processes:

Step 3.1, a residual $r_t$ of the current state is calculated.

Step 3.2, a similarity trend $t_t$ of the current state is calculated.

Step 3.3, a risk coefficient $d_t$ is calculated.

Further, the step 1.6 includes the following specific processes:

Step 1.6.1, a nerve cell u with a greatest local error is determined.

Step 1.6.2, a nerve cell v, with a greatest error, of the u in neighbors is determined.

Step 1.6.3, a "middle" node r is created in the middle between the u and the v:

$$w_r = \frac{w_u + w_v}{2}. \quad (6)$$

Step 1.6.4, an edge between the u and the v is replaced with an edge between the u and the r and an edge between the v and the r.

Step 1.6.5, the errors of the nerve cells u and v are reduced, and an error value of the nerve cell r is set:

$$E_u \leftarrow E_u \cdot a \quad (7),$$

$$E_v \leftarrow E_v \cdot a \quad (8), \text{ and}$$

$$E_r < E_u \quad (9).$$

Further, the step 2 includes the following specific processes:

Step 2.1.1, the LS-SVM regression model is built. Specifically, a Lagrangian function is introduced for solving it. A radial basis function $K(x,x_i)=\exp(-\|x-x_i\|_2/2\sigma^2)$ is selected, and σ is a kernel width. The LS-SVM regression model is obtained:

$$f(x) = \sum_{i=1}^{l} \alpha_i K(x, x_i) + b. \quad (5)$$

Step 2.1.2, whether a historical optimum adaptive degree $P_b$ meets a constraint condition or whether the number of iterations reaches the maximum is checked. If the constraint condition is still not met, and the number of iterations is not the maximum, a step 2.1.3 is performed, and otherwise, a result is mapped into the kernel function σ and the penalty coefficient c of the LS-SVM model.

Step 2.1.3, speed and positions of particles are regulated, and an inertia weight is regulated.

Further, in the step 2.1.3, a self-adaptative regulation inertia weight method is used to regulate the inertia weight:

$$w = \begin{cases} w_{min} - \frac{(w_{max} - w_{min})(f - f_{min})}{f_{avg} - f_{min}}, & f < f_{avg} \\ w_{max}, & f \geq f_{avg} \end{cases} \quad (10)$$

In the formula, $w_{min}$ is a minimum value of w. $w_{max}$ is a maximum value of w. f is an adaptive degree of a current particle. $f_{avg}$ is an average adaptive value of all particles. $f_{min}$ is a minimum adaptive value of all particles.

Further, a specific process for calculating the residual $r_i$ of the current state in the step 3.1 is as follows:

$$r_i = y_i - f(x_i) \quad (11).$$

In the formula, $y_i$ is a true value in a sample set, and $f(x_i)$ is a predicated value of the LS-SVM regression model after optimization by the improved particle swarm algorithm.

Further, a specific process for calculating the similarity trend $t_i$ of the current state in the step 3.2 is as follows:

$$t_i = \frac{1}{n}\sqrt{\sum_{j=1}^{n}(x_i - X_j)^2}. \quad (12)$$

In the formula, $x_i$ is a coordinate of the current state, and $X_j$ is a coordinate of the j-th clustering center.

Further, a specific process for calculating the risk coefficient $d_i$ in the step 3.3 is as follows:

$$d_i = ar_i + bt_i \quad (13).$$

In the formula, a and b are weight factors, and are initialized to 0.5 and 0.5 according to historical data.

Further, the step of translating the winner nerve cell s and all topological neighbors thereof refers to all nerve cells having connections with the winner nerve cell s.

As a preference, in the step 1.5, if the two optimum nerve cells s and t are connected, the age of the connection is set to be zero, and otherwise, a connection is created between the two optimum nerve cells.

As a preference, in the step 1, a growing neural gas (GNG) algorithm is used to calculate the feature vector of the historical normal operation state.

The embodiment is only directed to illustrate the technical idea of the present invention, but are not to be considered to limit the protection scope of the present invention. Technical ideas provided according to the present invention, and any modification made on the basis of the technical scheme shall fall within the protection scope of the present invention.

The invention claimed is:

1. A malfunction early warning method of production logistics delivery equipment, comprising the following steps:
    arranging a plurality of sensors in a production line, and collecting data including vibration acceleration signals of bearings and a speed reducer, belt displacement, of main parts of the equipment used in production are collected by a plurality of sensors; and
    detecting and predicting vibration acceleration for bearings and gearboxes,
    detecting and predicting current and voltage signals for servo motors, and
    detecting and predicting belt displacement signals,
    detecting and predicting temperature and humidity signals of major components, steps configured to be executed by one or more processors, comprising
    step 1, calculating a feature vector of a historical normal operation state based on signal data obtained by the plurality of sensors, dividing normal state data into a plurality of work conditions to obtain a plurality of clustering centers, and calculating a Euclidean distance from a current state to the clustering centers so as to obtain a similarity trend;
    step 2, building a historical memory matrix, optimizing parameters of an LS-SVM regression model, and calculating a residual of the current state and the regression model; and
    step 3, obtaining a risk coefficient by combining the similarity trend and the residual, evaluating an equipment operation state, and making timely early warning on faults;
    wherein the step 1 comprises the following specific processes:

step 1.1, performing initialization: creating two nodes with weight vectors, and a zero value of a local error;

step 1.2, inputting a vector into a neural network x, and finding two nerve cells s and t in positions closest to the x, i.e., the nodes with weight vectors $w_s$ and $w_t$, wherein $\|w_s-x\|^2$ is a node with a smallest distance value in all nodes, and $\|w_t-x\|^2$ is a node with a second-smallest distance value in all nodes;

step 1.3, updating a local error of a winner nerve cell s, and adding the local error of the winner nerve cell s into a squared distance of the vector $w_S$ and the x:

$$E_S \leftarrow E_S + \|w_S - x\|^2 \quad (1);$$

step 1.4, translating the winner nerve cell s and all topological neighbors thereof, wherein a direction is an input vector x, and distances equal to partial $\in_w$ and whole $\in_n$:

$$w_s \leftarrow w_s + \in_w \cdot (w_s - x) \quad (2), \text{ and}$$

$$w_n \leftarrow w_n + \in_n \cdot (w_n - x) \quad (3);$$

step 1.5, by using 1 as a step amplitude, increasing ages of all connections from the winner nerve cell s, and removing the connections with the ages being elder than $age_{max}$; and if a result in the nerves cells does not have more divergence margins, also removing the nerve cells;

step 1.6, if the number of current iterations is a multiple of λ, and does not reach a limit dimension of a network, inserting a new nerve cell r as follows;

step 1.7, reducing all errors of a nerve cell j by using a fraction β:

$$E_j \leftarrow E_j - E_j \cdot \beta \quad (4); \text{ and}$$

step 1.8, if a stop condition is not met, continuing the step 2.

2. The malfunction early warning method of production logistics delivery equipment according to claim 1, wherein in the step 2, the improved particle swarm algorithm is used to optimize a kernel function σ and a penalty coefficient c in the LS-SVM regression model.

3. The malfunction early warning method of production logistics delivery equipment according to claim 2, wherein the step 2 comprises the following specific processes:

step 2.1.1, building the LS-SVM regression model: introducing a Lagrangian function for solving it, and selecting a radial basis function $K(x,x_i) = \exp(-\|x-x_i\|_2/2\sigma^2)$, wherein σ is a kernel width; and obtaining the LS-SVM regression model:

$$f(x) = \sum_{i=1}^{l} \alpha_i K(x, x_i) + b; \quad (5)$$

step 2.1.2, checking whether a historical optimum adaptive degree $P_b$ meets a constraint condition or whether the number of iterations reaches the maximum, if the constraint condition is still not met, and the number of iterations is not the maximum, performing a step 2.1.3, and otherwise, mapping a result into the kernel function σ and the penalty coefficient c of the LS-SVM model; and step 2.1.3, regulating speed and positions of particles, and regulating an inertia weight.

4. The malfunction early warning method of production logistics delivery equipment according to claim 3, wherein in the step 2.1.3, a self-adaptative regulation inertia weight method is used to regulate the inertia weight:

$$w = \begin{cases} w_{min} - \dfrac{(w_{max} - w_{min})(f - f_{min})}{f_{avg} - f_{min}}, & f < f_{avg} \\ w_{max}, & f \geq f_{avg} \end{cases} \quad (10)$$

wherein in the formula, $w_{min}$ is a minimum value of w, $w_{max}$ is a maximum value of w, f is an adaptive degree of a current particle, $f_{avg}$ is an average adaptive value of all particles, and $f_{min}$ is a minimum adaptive value of all particles.

5. The malfunction early warning method of production logistics delivery equipment according to claim 1, wherein the step 3 comprises the following specific processes:

step 3.1, calculating a residual $r_i$ of the current state;

step 3.2, calculating a similarity trend $t_i$ of the current state; and step 3.3, calculating a risk coefficient $d_i$.

6. The malfunction early warning method of production logistics delivery equipment according to claim 5, wherein a specific process for calculating the residual $r_i$ of the current state in the step 3.1 is as follows:

$$r_i = y_i - f(x_i) \quad (11)$$

wherein in the formula, $y_i$ is a true value in a sample set, and $f(x_i)$ is a predicated value of the LS-SVM regression model after optimization by the improved particle swarm algorithm.

7. The malfunction early warning method of production logistics delivery equipment according to claim 5, wherein a specific process for calculating the similarity trend $t_i$ of the current state in the step 3.2 is as follows:

$$t_i = \frac{1}{n}\sqrt{\sum_{j=1}^{n}(x_i - X_j)^2} \quad (12)$$

wherein in the formula, $x_i$ is a coordinate of the current state, and $X_j$ is a coordinate of the j-th clustering center.

8. The malfunction early warning method of production logistics delivery equipment according to claim 5, wherein a specific process for calculating the risk coefficient $d_i$ in the step 3.3 is as follows:

$$d_i = ar_i + bt_i \quad (13)$$

wherein in the formula, a and b are weight factors, and are initialized to 0.5 and 0.5 according to historical data.

9. The malfunction early warning method of production logistics delivery equipment according to claim 1, wherein the step 1.6 comprises the following specific processes:

step 1.6.1, determining a nerve cell u with a greatest local error;

step 1.6.2, determining a nerve cell v, with a greatest error, of the u in neighbors;

step 1.6.3, creating a "middle" node r in the middle between the u and the v:

$$w_r = \frac{w_u + w_v}{2}; \quad (6)$$

step 1.6.4, replacing an edge between the u and the v with an edge between the u and the r and an edge between the v and the r; and step 1.6.5, reducing the errors of the nerve cells u and v, and setting an error value of the nerve cell r:

$$E_u \leftarrow E_u \cdot a \quad (7),$$

$$E_v \leftarrow E_v \cdot a \quad (8), \text{ and}$$

$$E_r \leftarrow E_u \quad (9).$$

10. The malfunction early warning method of production logistics delivery equipment according to claim 1, wherein the step of translating the winner nerve cell s and all topological neighbors thereof refers to all nerve cells having connections with the winner nerve cell s.

11. The malfunction early warning method of production logistics delivery equipment according to claim 1, wherein in the step 1.5, if the two optimum nerve cells s and t are connected, the age of the connection is set to be zero, and otherwise, a connection is created between the two optimum nerve cells.

12. The malfunction early warning method of production logistics delivery equipment according to claim 1, wherein in the step 1, a growing neural gas (GNG) algorithm is used to calculate the feature vector of the historical normal operation state.

* * * * *